United States Patent
Fukuda et al.

(10) Patent No.: US 10,245,884 B2
(45) Date of Patent: Apr. 2, 2019

(54) PROTECTIVE COVER HAVING SENSOR HOLDER PART, BEARING DEVICE INCLUDING THE PROTECTIVE COVER, AND METHOD FOR MANUFACTURING PROTECTIVE COVER HAVING SENSOR HOLDER PART

(71) Applicant: NAKANISHI METAL WORKS CO., LTD., Osaka-shi (JP)

(72) Inventors: Osamu Fukuda, Osaka (JP); Yasuhiro Narazaki, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 15/192,220

(22) Filed: Jun. 24, 2016

(65) Prior Publication Data

US 2017/0001471 A1   Jan. 5, 2017

(30) Foreign Application Priority Data

Jul. 3, 2015   (JP) .................................. 2015-134080
Apr. 1, 2016   (JP) .................................. 2016-073891

(51) Int. Cl.
  B29C 45/00        (2006.01)
  B29C 45/56        (2006.01)
  (Continued)

(52) U.S. Cl.
  CPC ...... B60B 27/0073 (2013.01); B29C 45/0025 (2013.01); B29C 45/561 (2013.01); B60B 27/001 (2013.01); B60B 27/0068 (2013.01); F16C 33/723 (2013.01); F16C 33/7833 (2013.01); F16C 33/7886 (2013.01); F16C 41/007 (2013.01); B29C 2045/0032 (2013.01); B29C 2045/0041 (2013.01);
  (Continued)

(58) Field of Classification Search
  CPC .. F16C 33/723; F16C 41/007; F16C 2220/04; B60B 27/0068; B60B 27/0073
  USPC ......................................................... 384/448
  See application file for complete search history.

(56) References Cited

U.S. PATENT DOCUMENTS

| 8,534,126 B2 * | 9/2013 | Serafini ................. F16C 33/723 384/448 |
| 8,764,299 B2 * | 7/2014 | Torii ................... B60B 27/0005 384/448 |
| 2015/0231922 A1 * | 8/2015 | Kaiser ................ B60B 27/0073 384/479 |

FOREIGN PATENT DOCUMENTS

JP   2004-354066 A1   12/2004
JP   2011-2029        *   1/2011

OTHER PUBLICATIONS

Translation of JP2011-2029 obtained Sep. 13, 2017.*

* cited by examiner

*Primary Examiner* — James Pilkington
(74) *Attorney, Agent, or Firm* — Kratz, Quintos & Hanson, LLP

(57) ABSTRACT

A protective cover (1) having a reliable sensor holder part (3B) that prevents reduction in air tightness and strength of a division wall (B) between a magnetic sensor (A) and a magnetic encoder (16). The protective cover (1) is press-fitted into an outer ring to seal one axial end portion of a bearing, and has the sensor holder part (3B) holding the magnetic sensor (A). In the protective cover (1), a disc-shaped member (3) has a thick part (6) formed as a flow path for preferentially charging a molten resin into a thin part for forming the division wall (B) in a cavity of a molding die for use in injection molding between a position corresponding to a gate of the molding die and the division wall (B).

2 Claims, 14 Drawing Sheets

(51) Int. Cl.
*B29K 77/00* (2006.01)
*B60B 27/00* (2006.01)
*F16C 19/18* (2006.01)
*F16C 33/72* (2006.01)
*F16C 33/78* (2006.01)
*F16C 41/00* (2006.01)
*B29K 105/16* (2006.01)
*B29K 509/08* (2006.01)

(52) U.S. Cl.
CPC ............... *B29C 2045/564* (2013.01); *B29C 2045/5615* (2013.01); *B29K 2077/00* (2013.01); *B29K 2105/16* (2013.01); *B29K 2509/08* (2013.01); *F16C 19/187* (2013.01); *F16C 2220/04* (2013.01); *F16C 2326/02* (2013.01)

PROTECTIVE COVER HAVING SENSOR HOLDER PART, BEARING DEVICE INCLUDING THE PROTECTIVE COVER, AND METHOD FOR MANUFACTURING PROTECTIVE COVER HAVING SENSOR HOLDER PART

TECHNICAL FIELD

The present invention relates to a cup-shaped protective cover that is press-fitted into an outer ring of a bearing to cover a magnetic encoder, more specifically to a protective cover having a sensor holder part holding a magnetic sensor opposed to the magnetic encoder.

BACKGROUND ART

An antilock brake system widely used in automobiles for efficient and safety braking without locking of wheels detects the rotation speeds of wheels by a rotation speed detector (wheel speed sensor), calculates the acceleration and the deceleration and estimates the vehicle speed and the slip ratio by a controller, and drives an actuator to control the brake fluid pressure based on the calculation and estimation results, for example.

Bearing devices including such a rotation speed detector in a roll bearing for supporting automobile wheels (hub bearing) are also widely used. Such a bearing device may be structured such that a magnetic encoder having N and S poles alternately arranged at constant intervals in the circumferential direction is fitted to the inner ring at one axial end portion of a bearing, and a protective cover is press-fitted into the outer ring at one axial end portion of the bearing (for example, refer to Patent Document 1).

The protective cover of the invention described in Patent Document 1 is formed from a synthetic resin in a covered cylindrical shape and is provided with a sensor holder part that holds a magnetic sensor for detecting the rotation of the magnetic encoder (refer to Patent Document 1).

While the protective cover of the invention described in Patent Document 1 is used, the magnetic sensor is opposed to the magnetic encoder with a division wall integrally formed in the protective cover therebetween.

Accordingly, using the protective cover eliminates the need to incorporate a rubber seal member such as an O ring between the wall surface in which a sensor attachment hole is formed and the magnetic sensor as in the protective cover with the sensor attachment hole penetrating in the thickness direction (see FIG. 3(b) describing the related art section of Patent Document 1).

In addition, by providing the protective cover with the sensor holder part, the one axial end portion of the bearing is sealed to keep pebbles and muddy water off the magnetic encoder. This prevents breakage of the magnetic encoder and eliminates the need for the seal member on the outer side of the magnetic encoder. Accordingly, sliding resistance decreases to reduce the rotation torque of the bearing device and obviate the trouble of adjusting an air gap between the magnetic encoder and the magnetic sensor.

CITATION LIST

Patent Literatures

Patent Document 1: JP-A No. 2004-354066

SUMMARY OF INVENTION

Technical Problem

The protective cover having the sensor holder part of the invention described in Patent Document 1 has the foregoing features.

However, from the viewpoint of improving the detection accuracy of the magnetic sensor, the division wall is as thin as about 0.3 to 0.5 mm, and the relative difference between the thickness of the main body part and the thickness of the division wall is large. In addition, the protective cover is molded of a fiber-reinforced resin such as a glass fiber-reinforced polyamide resin in many cases. Accordingly, during injection molding, when the molten resin is charged from a molding space for molding the main body part into a molding space for molding the division wall, the molten resin is lastly charged into part of the molded division wall (charging end), and a merging portion of the molten resin from the surroundings (weld) is generated on part of the division wall. Therefore, when the main body part and the division wall are integrally molded, a charging end weld is generated on part of the division wall.

This results in a problem of reduction in air tightness and strength of the division wall, and a problem of uneven thickness of the division wall.

Moreover, the division wall is thin as described above, which may cause a charging failure and disable molding.

In light of the foregoing circumstances, to solve the problems, an object of the present invention is to provide a method for manufacturing a protective cover having a reliable sensor holder part that prevents reduction in air tightness and strength of a division wall between a magnetic sensor and a magnetic encoder.

Solution to Problem

To solve the foregoing problems, a protective cover having a sensor holder part according to the present invention is a protective cover in a bearing device including: an inner ring with an inner ring track surface on an outer peripheral surface; an outer ring with an outer ring track surface on an inner peripheral surface; a bearing having a rolling element rolling between the inner ring track surface and the outer ring track surface; a magnetic encoder that is positioned at one axial end portion of the bearing, fixed to the inner ring, and has N and S poles alternately arranged at regular intervals in an circumferential direction; and a magnetic sensor that is opposed to the magnetic poles of the magnetic encoder to detect rotation of the magnetic encoder, wherein the protective cover is a cup-shaped protective cover that is press-fitted into the outer ring to seal the one axial end portion of the bearing, and has the sensor holder part holding the magnetic sensor and a division wall that is thinner than the other part to divide the magnetic encoder and the magnetic sensor, out of a cylindrical member and a disc-shaped member forming the cup shape, at least the disc-shaped member is a molded article formed by injection molding, and the disc-shaped member has a thick part as a flow path for preferentially charging a molten resin into a thin part for forming the division wall in a cavity of a molding die for use in the injection molding between a position corresponding to a gate of the molding die and the division wall.

In addition, to solve the foregoing problems, a protective cover having a sensor holder part according to the present invention is a protective cover in a bearing device including:

an inner ring with an inner ring track surface on an outer peripheral surface; an outer ring with an outer ring track surface on an inner peripheral surface; a bearing having a rolling element rolling between the inner ring track surface and the outer ring track surface; a magnetic encoder that is positioned at one axial end portion of the bearing, fixed to the inner ring, and has N and S poles alternately arranged at regular intervals in an circumferential direction; and a magnetic sensor that is opposed to the magnetic poles of the magnetic encoder to detect rotation of the magnetic encoder, wherein the protective cover is a cup-shaped protective cover that is press-fitted into the outer ring to seal the one axial end portion of the bearing, and has the sensor holder part holding the magnetic sensor and a division wall that is thinner than the other part to divide the magnetic encoder and the magnetic sensor, out of a cylindrical member and a disc-shaped member forming the cup shape, at least the disc-shaped member is a molded article formed by injection molding, and the disc-shaped member has a mark of a main gate of a molding die for use in the injection molding or a removal processed portion formed by removing and processing the mark in a position separated from the division wall, and has a mark of a sub gate of the molding die for use in the injection molding or a removal processed portion formed by removing and processing the mark in or near the division wall.

According to these configurations of the protective covers, the magnetic sensor is opposed to the magnetic encoder with the division wall formed by a resin surface opposed to the magnetic sensor and its back surface therebetween, and there is no through hole penetrating through the sensor holder part in the thickness direction. This eliminates the need to incorporate a seal member such as an O ring.

In addition, the protective cover seals the one axial end portion of the bearing of the bearing device to keep pebbles or muddy water off the magnetic encoder, thereby preventing breakage of the magnetic encoder.

Further, the protective cover seals the one axial end portion of the bearing of the bearing device to eliminate the need for a seal member on the outer side of the magnetic encoder, thereby decreasing sliding resistance and reducing the rotation torque of the bearing device.

Furthermore, the protective cover includes the sensor holder part to obviate the trouble of adjusting an air gap between the magnetic encoder and the magnetic sensor.

Moreover, the protective cover is configured such that "the disc-shaped member has a thick part as a flow path for preferentially charging a molten resin into a thin part for forming the division wall in a cavity of a molding die for use in the injection molding between a position corresponding to a gate of the molding die and the division wall," and the molten resin can be preferentially charged from the flow path into the thin part at the time of injection molding, which causes no charging end weld on the division wall.

In addition, the protective cover is configured such that "the disc-shaped member has a mark of a main gate of a molding die for use in the injection molding or a removal processed portion formed by removing and processing the mark in a position separated from the division wall, and has a mark of a sub gate of the molding die for use in the injection molding or a removal processed portion formed by removing and processing the mark in or near the division wall," and the molten resin can be preferentially charged from the sub gate into the thin part for forming the division wall at the time of injection molding, which causes no charging end weld on the division wall.

Therefore, the protective cover having the sensor holder part can prevent reduction in air tightness and strength of the division wall between the magnetic sensor and the magnetic encoder.

A bearing device according to the present invention includes the protective cover.

A method for manufacturing a protective cover having a sensor holder part according to the present invention is a method for manufacturing a protective cover in a bearing device including: an inner ring with an inner ring track surface on an outer peripheral surface; an outer ring with an outer ring track surface on an inner peripheral surface; a bearing having a rolling element rolling between the inner ring track surface and the outer ring track surface; a magnetic encoder that is positioned at one axial end portion of the bearing, fixed to the inner ring, and has N and S poles alternately arranged at regular intervals in an circumferential direction; and a magnetic sensor that is opposed to the magnetic poles of the magnetic encoder to detect rotation of the magnetic encoder, the protective cover being a cup-shaped protective cover that is press-fitted into the outer ring to seal the one axial end portion of the bearing, and has the sensor holder part holding the magnetic sensor and a division wall that is thinner than the other part to divide the magnetic encoder and the magnetic sensor, wherein the manufacturing method comprises a charging step in injection molding of charging a molten resin into a cavity of a molding die for molding, out of a cylindrical member and a disc-shaped member forming the cup shape, at least the disc-shaped member, and at the charging step in the injection molding, the molten resin is charged so as not to generate a charging end weld on the division wall by performing: forming a flow path for preferentially charging the molten resin into a thin part for forming the division wall between a gate position of the cavity and the thin part; using a device capable of controlling mechanically the thickness of a portion to be the division wall in the molding die to perform a control such that the portion to be the division wall becomes thick in the first half of the step and the portion to be the division wall becomes thin in the second half of the step to preferentially charge the molten resin into the portion to be the division wall when the portion is thick in the first half of the step and thin the portion to be the division wall in the second half of the step; or arranging a main gate in the cavity in a position separated from the thin part forming the division wall, arranging a sub gate in the thin part forming the division wall or near the thin part, and controlling a timing for injecting the molten resin from the sub gate relative to a timing for injecting the molten resin from the main gate to preferentially charge the molten resin from the sub gate into the thin part.

According to this manufacturing method, it is possible to charge the molten resin into the cavity of the molding die so as not to generate a charging end weld on the division wall that is thinner than other portions and formed in the disc-shaped member at the charging step in the injection molding for dividing the magnetic encoder and the magnetic sensor.

The protective cover having the sensor holder part manufactured by the manufacturing method makes it possible to prevent reduction in air tightness and strength of the division wall between the magnetic sensor and the magnetic encoder.

Advantageous Effects of Invention

According to the protective cover having the sensor holder part, the bearing device including the protective cover, and the method for manufacturing the protective cover having the sensor holder part of the present invention, the protective cover has no through hole penetrating through the sensor holder part in the thickness direction and has the synthetic resin division wall between the magnetic sensor and the magnetic encoder, which provides significant advantages in preventing reduction in air tightness and strength of the division wall with extensively improved reliability.

DESCRIPTION OF EMBODIMENTS

Next, embodiments of the present invention will be described in detail with reference to the accompanying drawings. However, the present invention is not limited to the embodiments illustrated in the accompanying drawings but includes all of embodiments satisfying the requirements described in the claims.

In a disc-shaped member 3 of a protective cover 1 described below, the sensor A-side surface will be called top surface and the magnetic encoder 16-side surface will be called bottom surface.

First Embodiment

Figure 1:
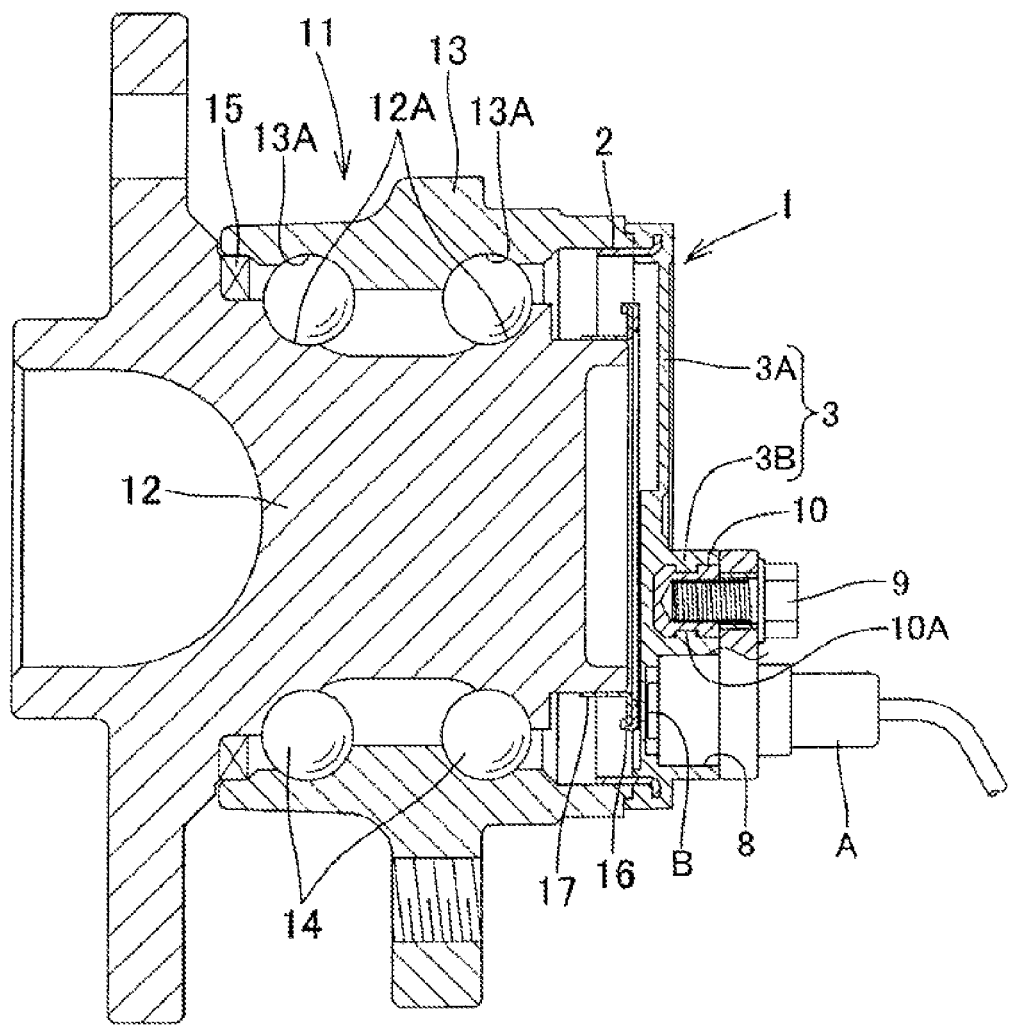
FIG. 1 is a vertical cross-sectional view of a bearing device including a protective cover having a sensor holder part according to a first embodiment of the present invention.

As illustrated in the vertical cross-sectional view of FIG. 1, a bearing device 11 according to a first embodiment of the present invention includes a bearing with an inner ring 12 rotating relative to an outer ring 13, a magnetic encoder 16, a protective cover 1, and a magnetic sensor A, and others.

The bearing has the inner ring 12 with an inner ring track surface 12A on the outer peripheral surface, the outer ring 13 with an outer ring track surface 13A on the inner peripheral surface, and rolling elements 14, 14, . . . rolling between the inner ring track surface 12A and the outer ring track surface 13A, and others.

The magnetic encoder 16 has N and S poles alternately arranged at regular intervals in the circumferential direction, and is fixed to the inner ring 12 by a support member 17 positioned at one axial end portion of the bearing.

The protective cover 1 also has a sensor holder part 3B attached to the outer ring 13 to seal the one axial end portion of the bearing and holding the magnetic sensor A.

The magnetic sensor A fitted to the sensor holder part 3B of the protective cover 1 is opposed to the magnetic encoder 16 with a division wall B therebetween to detect rotation of the magnetic encoder 16.

The bearing device 11 includes a seal member 15 arranged at the other axial end portion of the bearing, and others.

Figure 2:
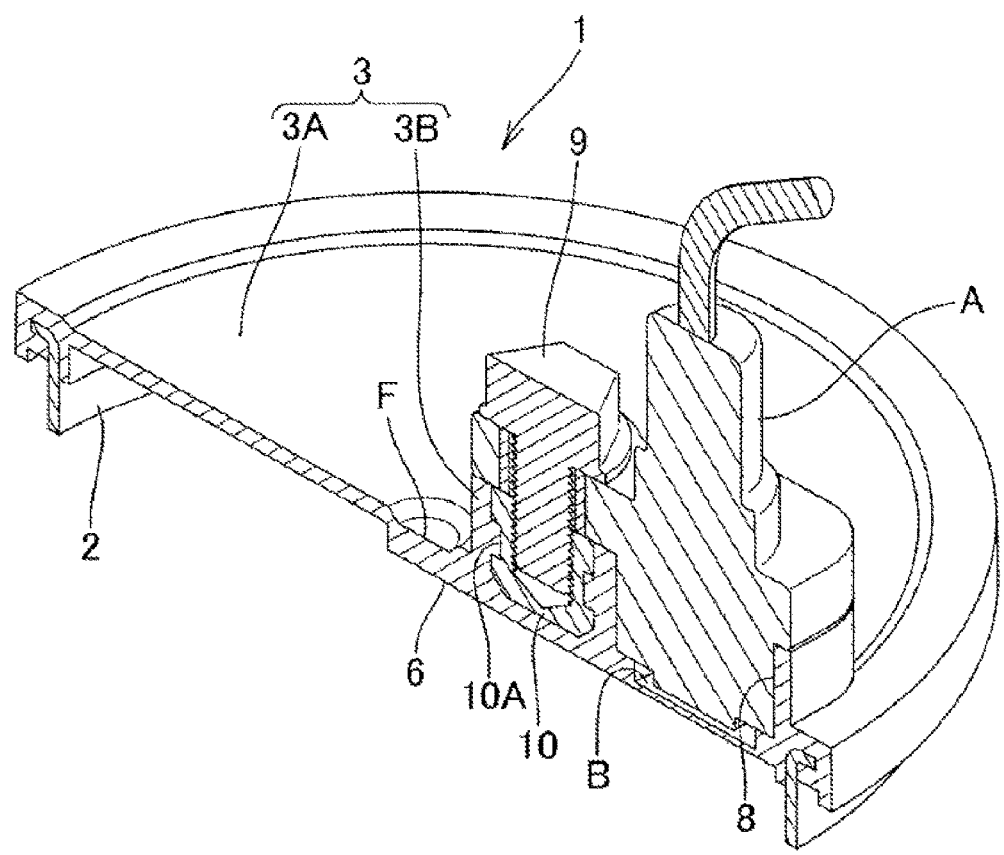
FIG. 2 is an enlarged perspective vertical cross-sectional view of main components, illustrating the state in which a magnetic sensor is attached to the protective cover.
Figure 3A:
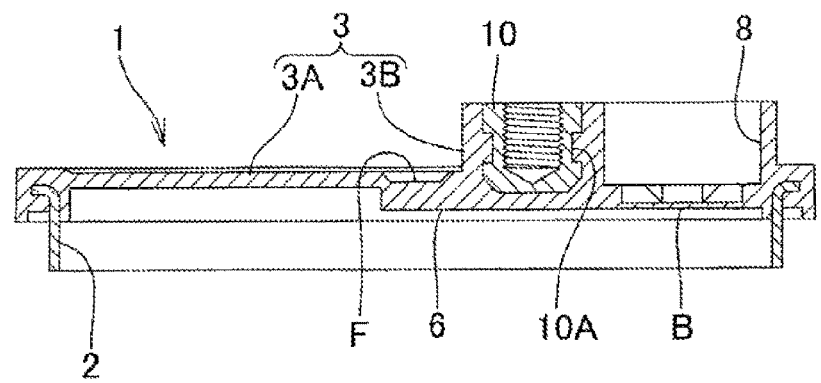
FIG. 3(a) is a vertical cross-sectional view of the protective cover and FIG. 3(b) is a bottom view of the same.
Figure 3B:
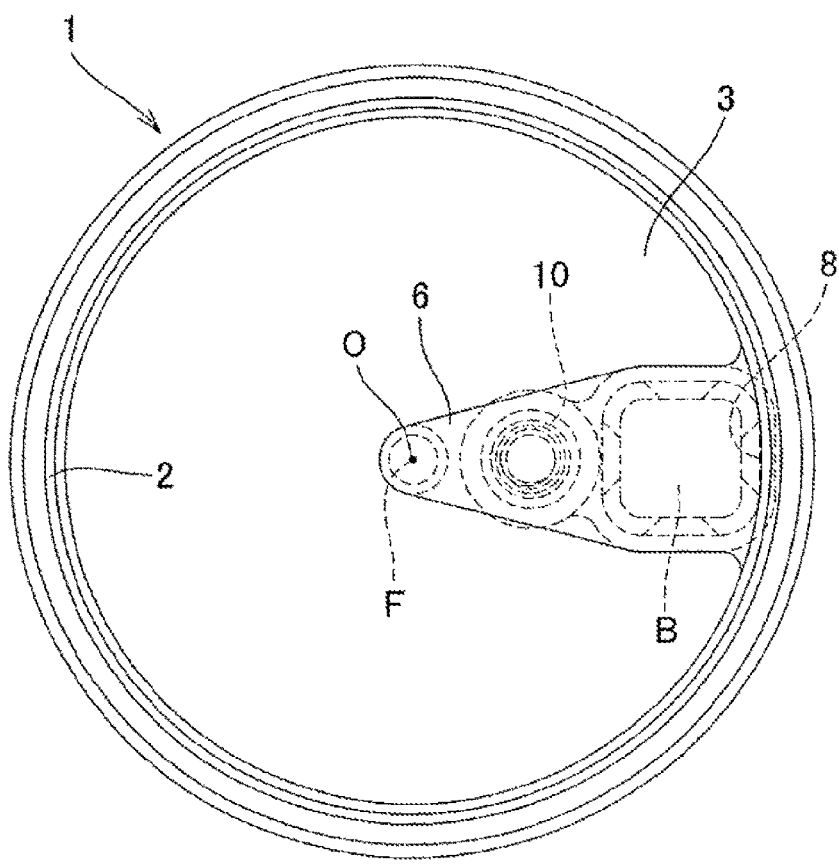

As illustrated in the vertical cross-sectional view of FIG. 1, the enlarged perspective vertical cross-sectional view of main components of FIG. 2, the vertical cross-sectional view of FIG. 3(a), and the bottom view of FIG. 3(b), the protective cover 1 according to the first embodiment of the present invention is composed of a cylindrical member 2 that is press-fitted into the outer ring 13 and is formed of a steel plate in a cylindrical shape, a synthetic resin disc-shaped member 3, and others.

The disc-shaped member 3 includes a main body part 3A in which the cylindrical member 2 is joined with the outer peripheral portion and a sensor holder part 3B that holds a nut 10 into which an attachment bolt 9 for attaching the magnetic sensor A is screwed and has a sensor attachment hole 8 into which the magnetic sensor A is inserted.

In this example, the protective cover 1 is an insert molded article and the cylindrical member 2 and the nut 10 are inserts.

As illustrated in FIG. 2, FIG. 3(a) and FIG. 3(b), the disc-shaped member 3 of the protective cover 1 has on its bottom surface a thick part 6 as a flow path for preferentially charging a molten resin into a thin part for forming the division wall B in a cavity of a molding die for use in injection molding described later between a position F corresponding to a gate of the molding die and the division wall B.

Figure 4:
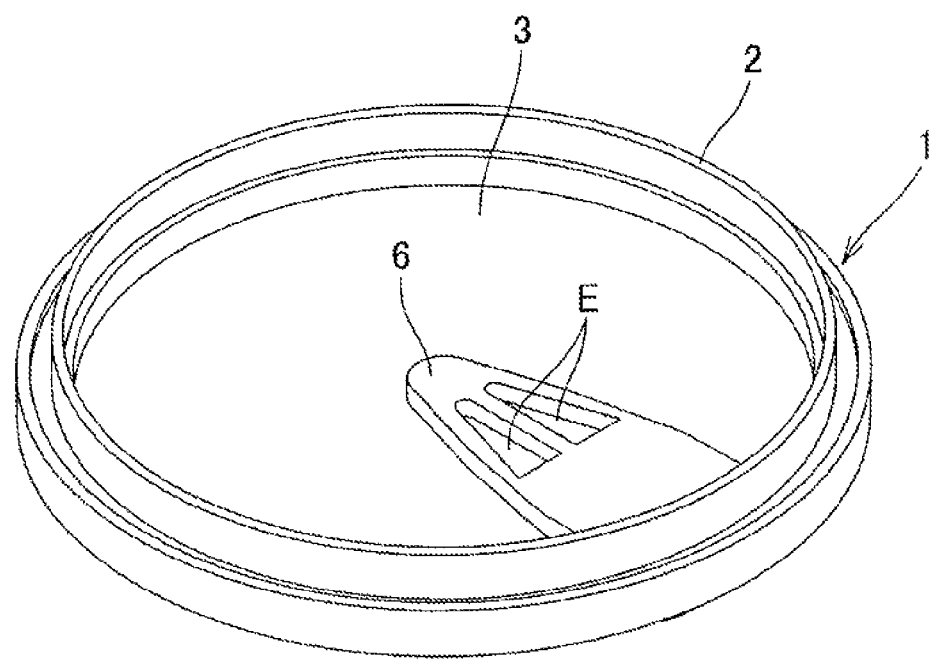
FIG. 4 is a perspective view of a modification example in which a thick part is provided with thinned portions as seen from the bottom side.

The thick part 6 is approximately fan-shaped (as the disc-shaped member 3 is seen from the bottom surface) such that it becomes gradually wider with increasing proximity to the position corresponding to the sensor holder part 3B including the division wall B (in a radially outward direction) from the position F corresponding to the gate positioned at a center O of the disc-shaped member 3, for example. The thickness of the thick part 6 (the thickness of the disc-shaped member 3 in the thickness direction) is about 1.2 to 3 times larger than the thickness of the surrounding part, for example. As illustrated in the perspective view of FIG. 4, thinned portions E may be provided in the middle of the fan shape at the formation of the thick part 6 to form a plurality of flow paths.

The molten resin is easier to flow into the thick part 6 than the surrounding thin part. The shape of the thick part 6 with the shortest flow path for the molten resin from the position F corresponding to the gate to the thin part for forming the division wall B is the approximately fan shape described above.

According to the configuration of the protective cover 1, the magnetic sensor A is opposed to the magnetic encoder 16 with the division wall B formed by the resin surface opposed to the magnetic sensor A and its back surface therebetween, and there is no through hole penetrating through the sensor holder part 3B in the thickness direction, which eliminates the need to incorporate a seal member such as an O ring.

In addition, the protective cover 1 seals the one axial end portion of the bearing of the bearing device 11 to keep pebbles or muddy water off the magnetic encoder 16, thereby preventing breakage of the magnetic encoder 16.

Further, the protective cover 1 seals the one axial end portion of the bearing of the bearing device 11 to eliminate the need for a seal member on the outer side of the magnetic encoder 16, thereby decreasing sliding resistance and reducing the rotation torque of the bearing device 11.

Furthermore, the protective cover 1 includes the sensor holder part 3B to obviate the trouble of adjusting an air gap between the magnetic encoder 16 and the magnetic sensor A.

Next, a method for manufacturing the protective cover 1 will be explained.

Injection molding for molding the protective cover 1 illustrated in FIG. 3 will be described with reference to an injection molding die illustrated in the vertical cross-sectional view of FIG. 5.

First, the nut 10 as an insert is set in a support shaft 20 of a fixed die 18, and the cylindrical member 2 as an insert is set in a movable die 19.

Then, the fixed die 18 and the movable die 19 are attached to an injection molding machine and are closed, and then a molten resin (molten plastic material) is injected from a sprue and charged from a gate G into a cavity C between the fixed die 18 and the movable die 19.

Figure 5:
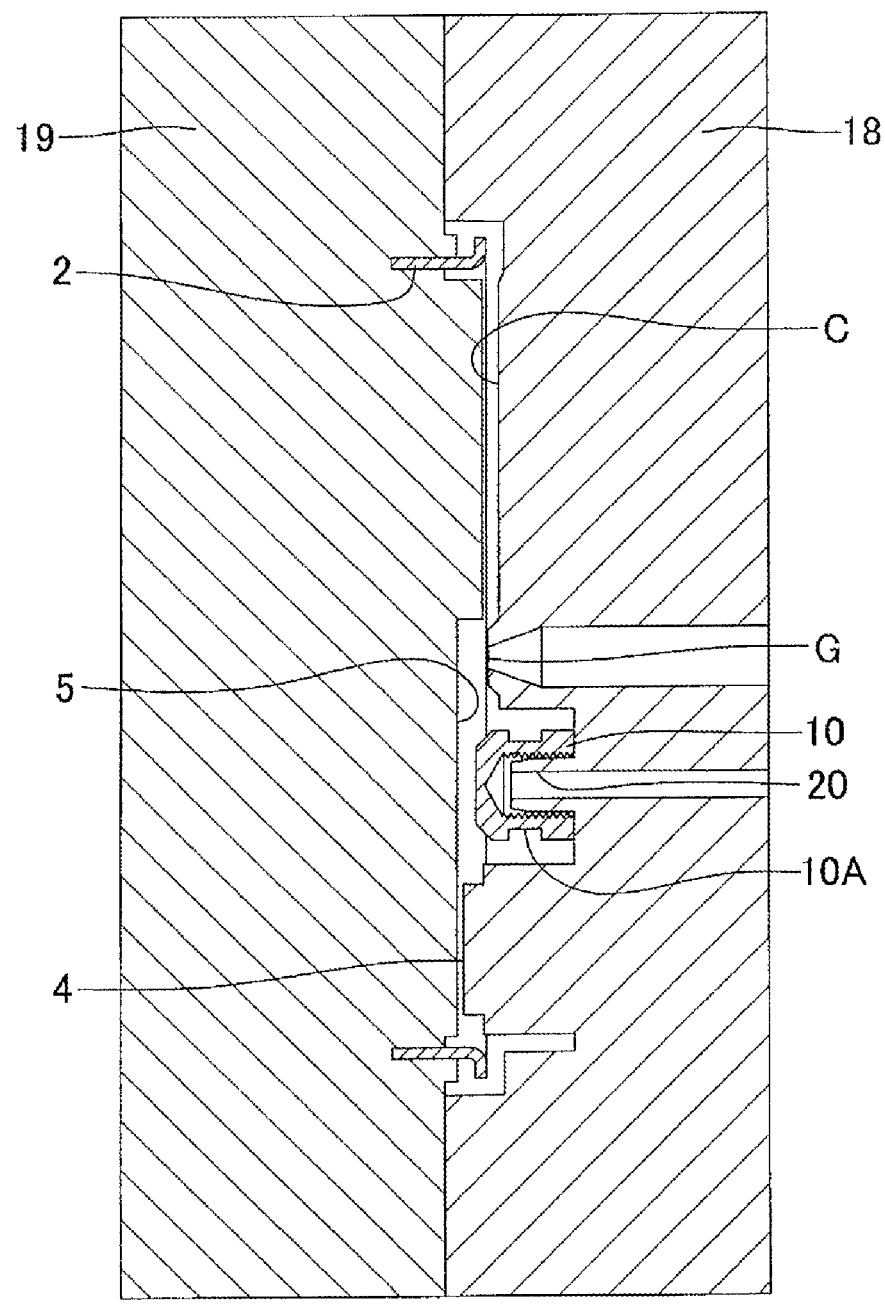
FIG. 5 is a vertical cross-sectional view of an injection molding die for molding the protective cover.

The cavity C illustrated in FIG. 5 has a flow path 5 for preferentially charging the molten resin into a thin part 4 for forming the division wall B illustrated in FIG. 3(a) and FIG. 3(b). Accordingly, the molten resin is preferentially charged from the flow path 5 into the thin part 4, thereby causing no charging end weld on the division wall B illustrated in FIG. 3(a) and FIG. 3(b).

Next, the molten resin is cooled and solidified, and the movable die 19 is opened to remove the insert molded article. The movable die 19 may be a slide core.

The plastic includes glass fiber of 20 to 70 weight % in polyamide (nylon 6, nylon 66, nylon 612, or the like), polyphenylene sulfide (PPS), or polybutylene terephthalate (PBT), for example.

In the protective cover 1 manufactured through injection molding as described above, the synthetic resin is entered into a peripheral groove 10A of the nut 10 so that the nut 10 is retained.

In addition, the outer peripheral portion of the main body part 3A wraps around the bending portion at the axial end of the cylindrical member 2 so that the cylindrical member 2 and the disc-shaped member 3 are mechanically joined together.

Further, the synthetic resin disc-shaped member 3 has no charging end weld on the division wall B thinner than the other part, which makes it possible to prevent reduction in air tightness and strength of the division wall B positioned between the magnetic sensor A and the magnetic encoder 16.

Next, a modification example of the shape of the protective cover 1 will be explained.

In the modification examples of the shape illustrated in FIG. 6(a), FIG. 6(b), FIG. 7(a), FIG. 7(b), FIG. 8(a), FIG. 8(b), FIG. 9(a), FIG. 9 (b), FIG. 10(a), FIG. 10(b), FIG. 11(a) and FIG. 11(b) described later, the same reference signs as those in FIGS. 2 and 3 indicate components and parts identical or equivalent to the components and parts described above with reference to FIG. 2, FIG. 3(a) and FIG. 3(b).

The thickness of the thick part 6 protruding on the top surface side in the following modification example is about 1.2 to 8 times larger than the thickness of the surrounding part, and reaches the height of the peripheral wall of the sensor attachment hole 8 at maximum. The thickness of the thick part 6 protruding on the bottom surface is about 1.2 to 3 times larger than the thickness of the surrounding part.

Figure 6A:
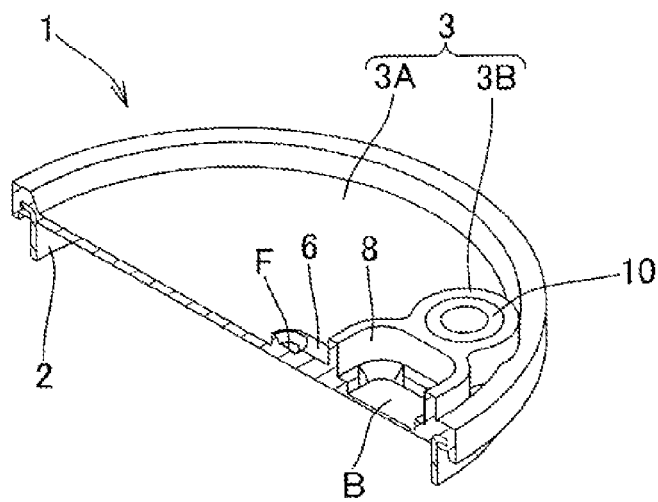
FIG. 6(a) and FIG. 6(b) illustrate a first modification example of the shape of the protective cover, FIG. 6(a) being an enlarged perspective vertical cross-sectional view of main components and FIG. 6(b) being a bottom view of the same.
Figure 6B:
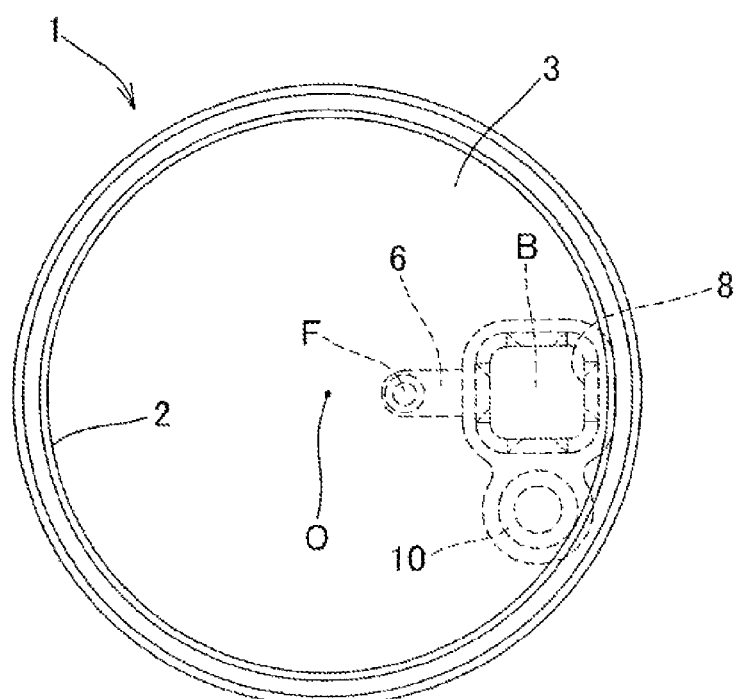

In a first modification example illustrated in the enlarged perspective vertical cross-sectional view of main components of FIG. 6(a) and the bottom view of FIG. 6(b), the thick part 6 is formed on the top surface side, not the bottom surface side as illustrated in FIGS. 3(a) and 3(b).

The position F corresponding to the gate is radially shifted from the center O of the disc-shaped member 3.

The thick part 6 is radially extended from the position F corresponding to the gate.

The height of the thick part 6 is smaller than the height of the peripheral wall of the sensor attachment hole 8.

Figure 7A:
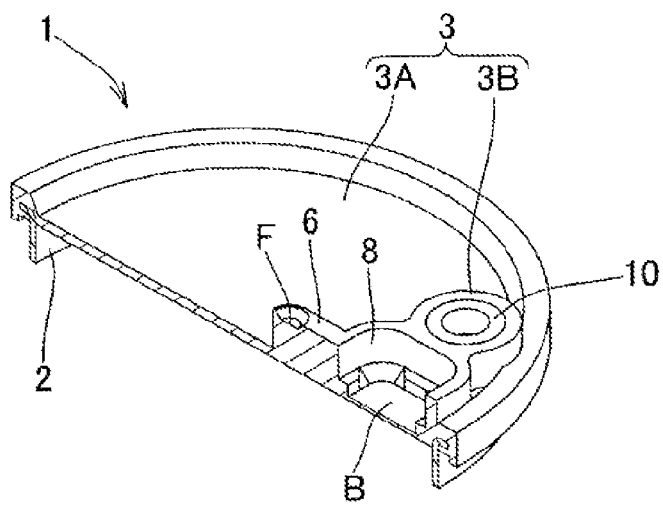
FIG. 7(a) and FIG. 7(b) illustrate a second modification example of the shape of the protective cover, FIG. 7(a) being an enlarged perspective vertical cross-sectional view of main components and FIG. 7(b) being a bottom view of the same.
Figure 7B:
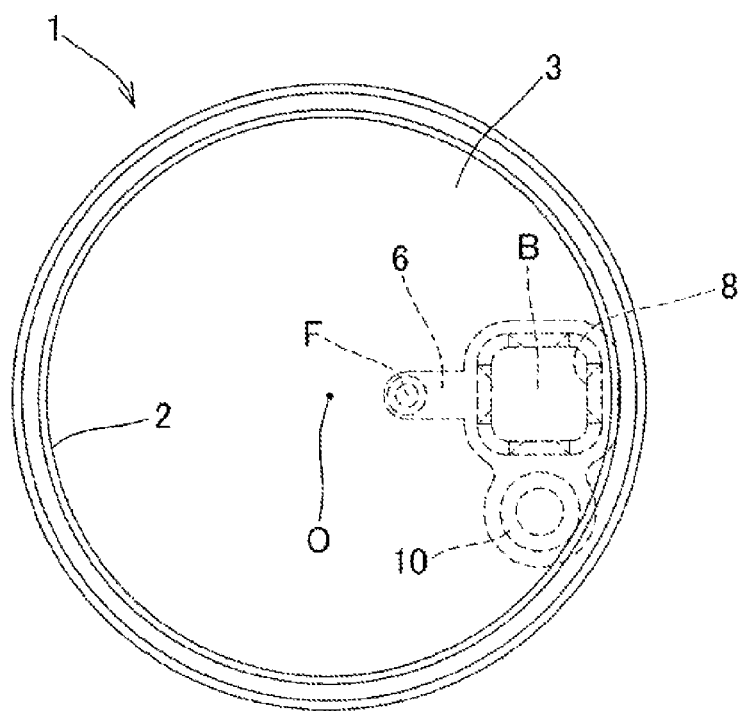

In a second modification example illustrated in the enlarged perspective vertical cross-sectional view of main components of FIG. 7(a) and the bottom view of FIG. 7(b), the height of the thick part 6 in the first modification example is set to be the same as the height of the peripheral wall of the sensor attachment hole 8.

Figure 8A:
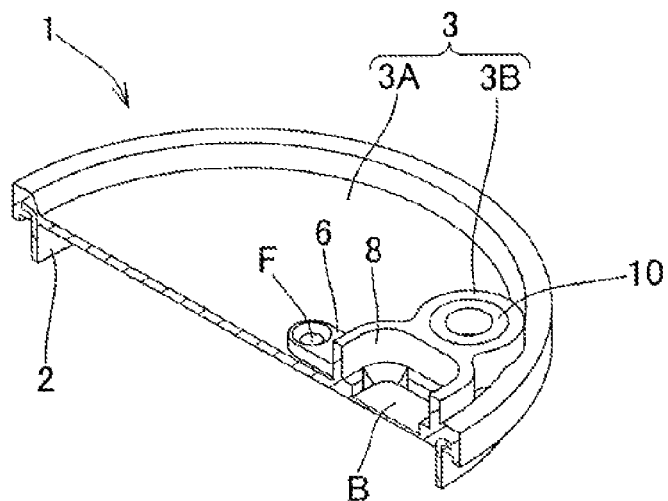
FIG. 8(a) and FIG. 8(b) illustrate a third modification example of the shape of the protective cover, FIG. 8(a) being an enlarged perspective vertical cross-sectional view of main components and FIG. 8(b) being a bottom view of the same.
Figure 8B:
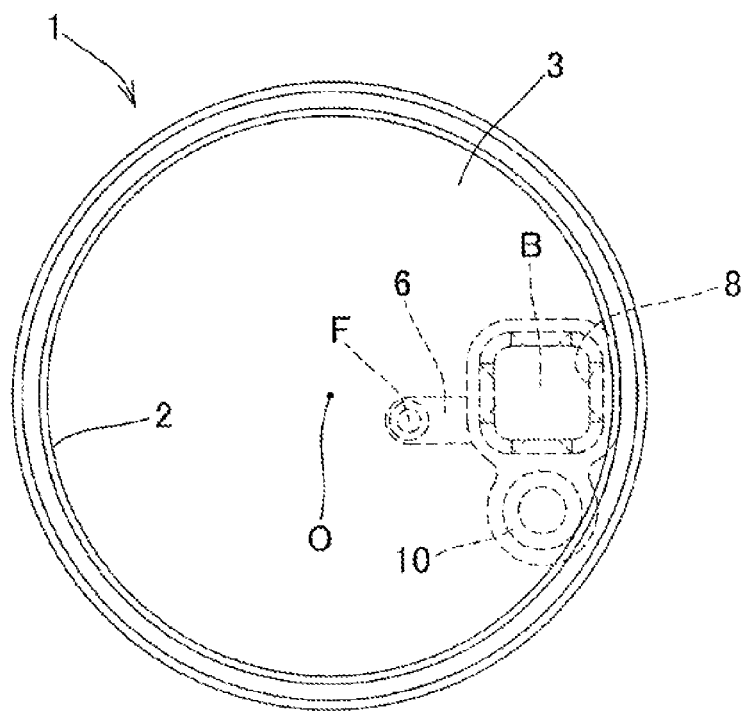

In a third modification example illustrated in the enlarged perspective vertical cross-sectional view of main components of FIG. 8(a) and the bottom view of FIG. 8(b), the thick part 6 is formed on the top surface side as in the first and second modification examples, and the position F corresponding to the gate is radially and circumferentially shifted from the center O of the disc-shaped member 3.

The thick part 6 is extended from the position F corresponding to the gate in parallel to the radial direction connecting from the center O to the center of the sensor attachment hole 8 (the division wall B). Alternatively, the thick part 6 may be extended from the position F corresponding to the gate in a direction at an angle with respect to a line parallel to the radial direction.

The height of the thick part 6 is smaller than the height of the peripheral wall of the sensor attachment hole 8 in the first modification example.

Figure 9A:
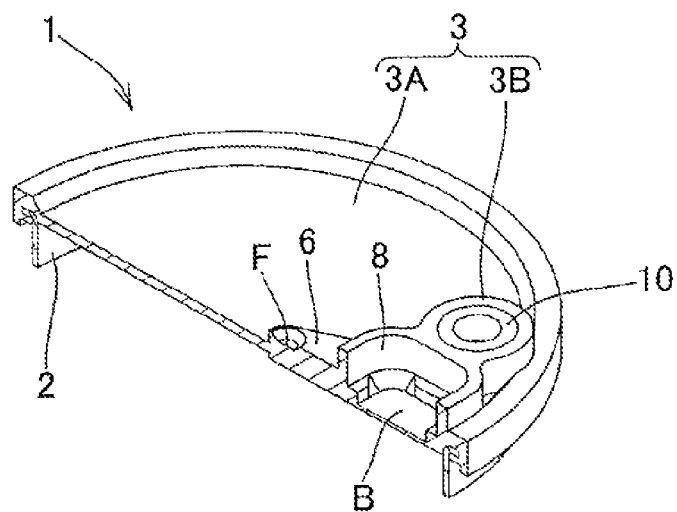
FIG. 9(a) and FIG. 9(b) illustrate a fourth modification example of the shape of the protective cover, FIG. 9(a) being an enlarged perspective vertical cross-sectional view of main components and FIG. 9(b) being a bottom view of the same.
Figure 9B:
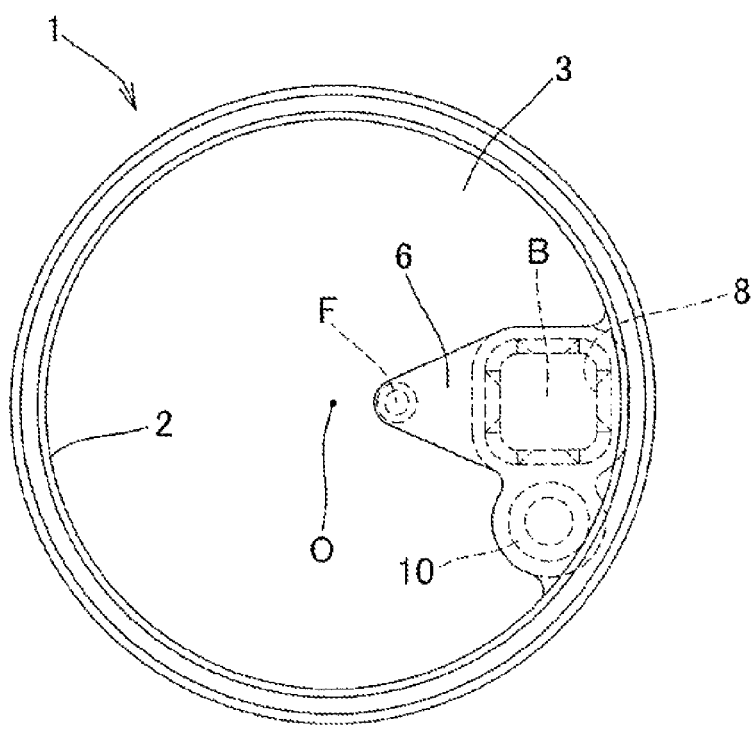
Figure 10A:
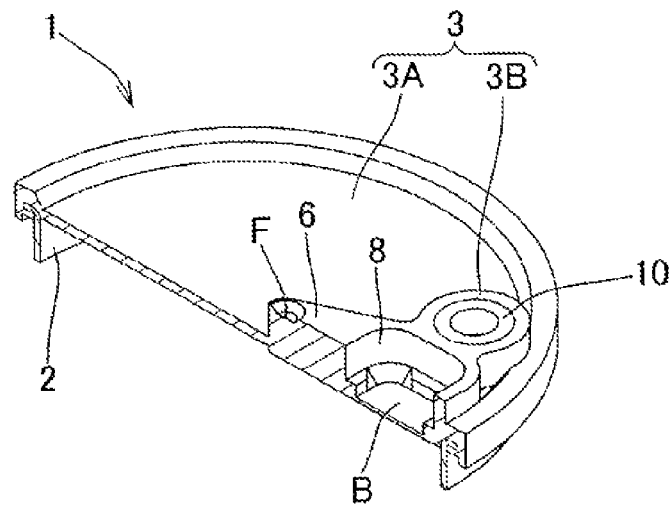
FIG. 10(a) and FIG. 10(b) illustrate a fifth modification example of the shape of the protective cover, FIG. 10(a) being an enlarged perspective vertical cross-sectional view of main components and FIG. 10(b) being a bottom view of the same.
Figure 10B:
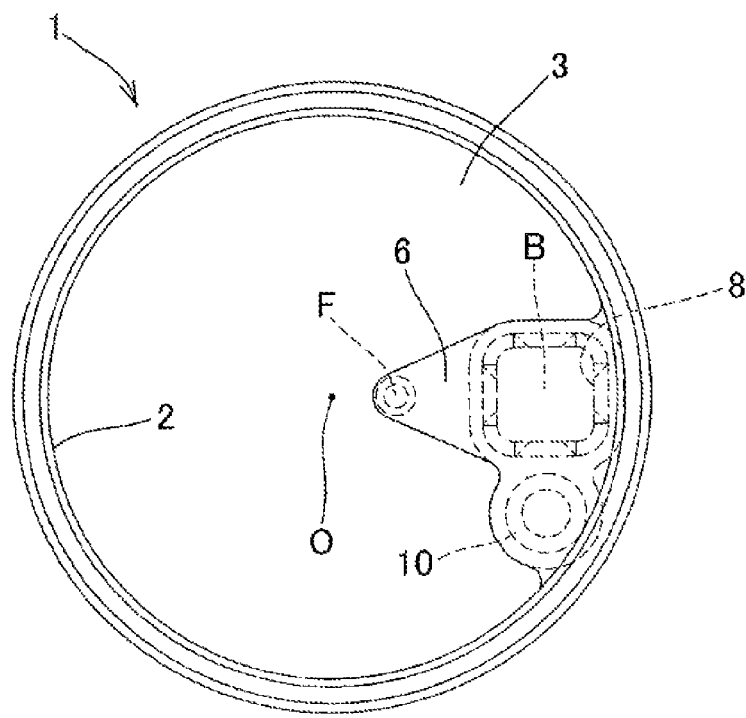
Figure 11A:
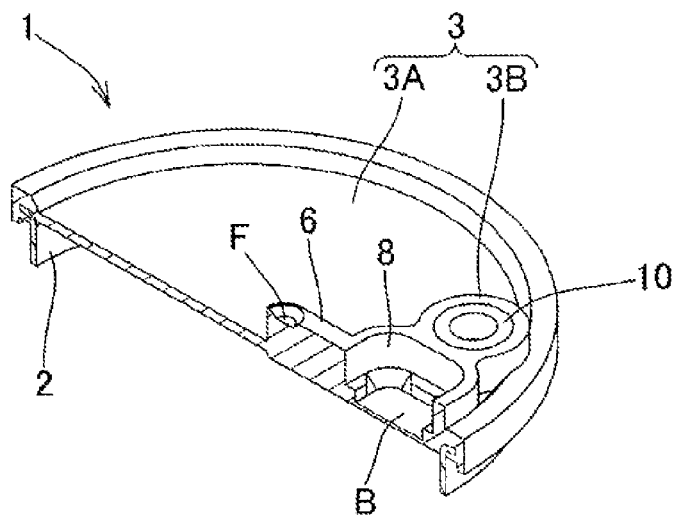
FIG. 11(a) and FIG. 11(b) illustrate a sixth modification example of the shape of the protective cover, FIG. 11(a) being an enlarged perspective vertical cross-sectional view of main components and FIG. 11(b) being a bottom view of the same.
Figure 11B:
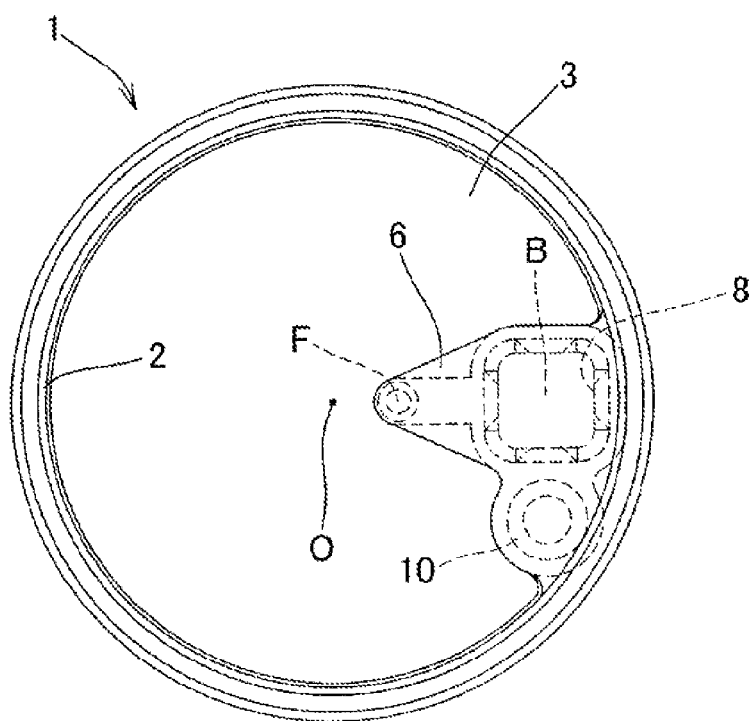

In a fourth modification example illustrated in the enlarged perspective vertical cross-sectional view of main components of FIG. 9(*a*) and the bottom view of FIG. 9(*b*), the thick part 6 is formed on both the bottom surface side and the top surface side.

The position F corresponding to the gate is radially shifted from the center O of the disc-shaped member 3.

The thick part 6 is formed in an approximately fan shape such that it becomes gradually wider in a radially outward direction from the position F corresponding to the gate.

The height of the thick part 6 on the top surface side is smaller than the height of the peripheral wall of the sensor attachment hole 8.

In a fifth modification example illustrated in the enlarged perspective vertical cross-sectional view of main components of FIG. 10(*a*) and the bottom view of FIG. 10(*b*), the height of the thick part 6 on the top surface side in the fourth modification example is equalized to the height of the peripheral wall of the sensor attachment hole 8.

In a sixth modification example illustrated in the enlarged perspective vertical cross-sectional view of main components of FIG. 11(*a*) and the bottom view of FIG. 11(*b*), the thick part 6 on the top surface side in the fifth modification example is formed in the same shape as the second modification example illustrated in FIG. 7, not the approximately fan shape.

Second Embodiment

Figure 12:
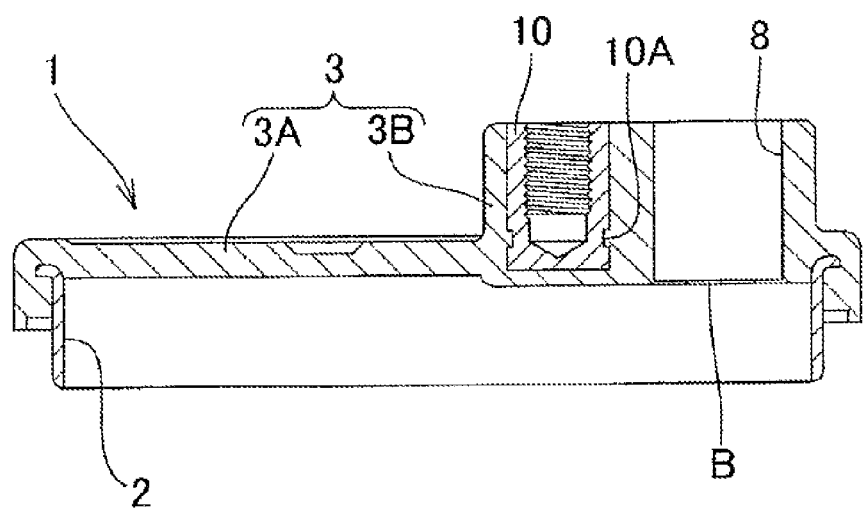
FIG. 12 is a vertical cross-sectional view of a protective cover having a sensor holder part according to a second embodiment of the present invention.

As illustrated in the vertical cross-sectional view of FIG. 12, in the protective cover 1 according to a second embodiment of the present invention, the same reference signs as those of the first embodiment illustrated in FIG. 3 indicate components identical or equivalent to those of the first embodiment.

The protective cover 1 according to the second embodiment does not have the thick part 6 unlike the protective cover 1 according to the first embodiment.

Next, injection molding for molding the protective cover 1 illustrated in FIG. 12 will be explained with reference to an injection molding die illustrated in the vertical cross-sectional view of FIG. 13(*a*) and FIG. 13(*b*). For the injection molding die, a device D capable of controlling mechanically the thickness of the portion 21 to be the division wall in the molding die is used.

Figure 13A:
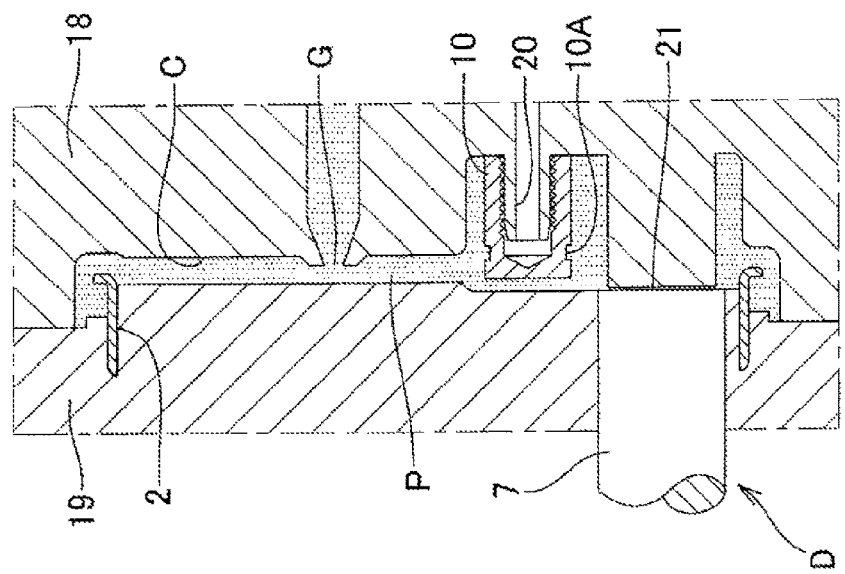
FIG. 13(a) and FIG. 13(b) are vertical cross-sectional views of an injection molding die for molding the protective cover having the sensor holder part according to the second embodiment of the present invention, FIG. 13(a) illustrating the first half of a charging step in injection molding while performing a control such that a portion to be a division wall becomes thick and FIG. 13(b) illustrating the second half of the charging step in injection molding while performing a control such that the portion to be the division wall becomes thin.
Figure 13B:
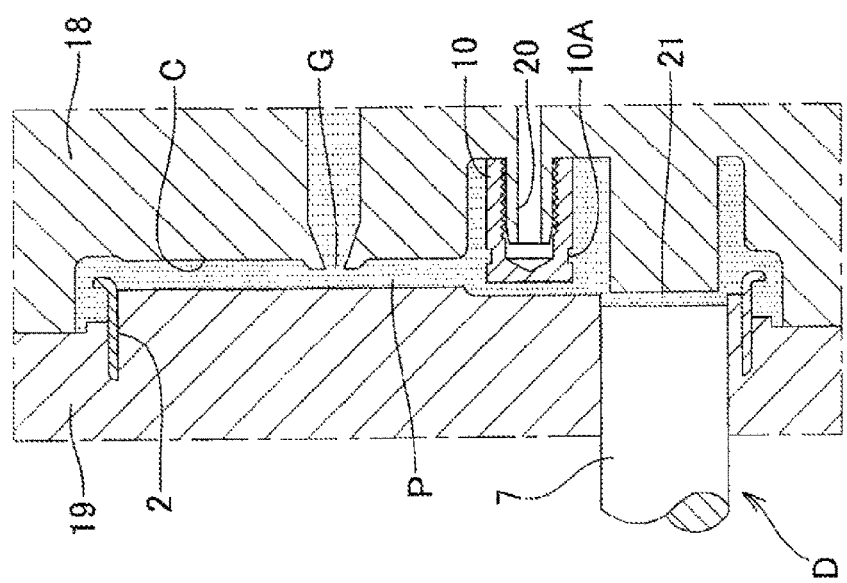

First, in the injection molding die illustrated in FIG. 13(*a*), the nut 10 as an insert is set in a support shaft 20 of a fixed die 18, and the cylindrical member 2 as an insert is set in a movable die 19.

Then, the fixed die 18 and the movable die 19 are attached to an injection molding machine and are closed, and then a molten resin P is injected from a sprue and charged from a gate G into a cavity C between the fixed die 18 and the movable die 19.

In the first half of a charging step in the injection molding illustrated in FIG. 13(*a*), a pressure pin 7 of the device D capable of controlling mechanically the thickness of the portion 21 to be the division wall in the molding die is moved backward to control and thicken the portion 21 to be the division wall. In this state, the molten resin P is preferentially charged into the portion 21 to be the division wall.

In the second half of the charging step in the injection molding illustrated in FIG. 13(*b*), the pressure pin 7 of the device D capable of controlling mechanically the thickness of the portion 21 to be the division wall in the molding die is moved forward to control and thin the portion 21 to be the division wall. Accordingly, the portion 21 to be the division wall is molded to be thin.

Therefore, no charging end weld is generated on the division wall B illustrated in FIG. 12, thereby making it possible to prevent reduction in air tightness and strength of the division wall B positioned between the magnetic sensor A and the magnetic encoder 16.

Next, another injection molding technique for molding the protective cover 1 illustrated in FIG. 12 will be explained with reference to an injection molding die illustrated in the vertical cross-sectional view of FIG. 14. The injection molding die includes a main gate MG and a sub gate SG. The sub gate SG is capable of time control. This makes it possible to control a timing for injecting a molten resin from the sub gate SG relative to a timing for injecting the molten resin from the main gate MG.

Figure 14:
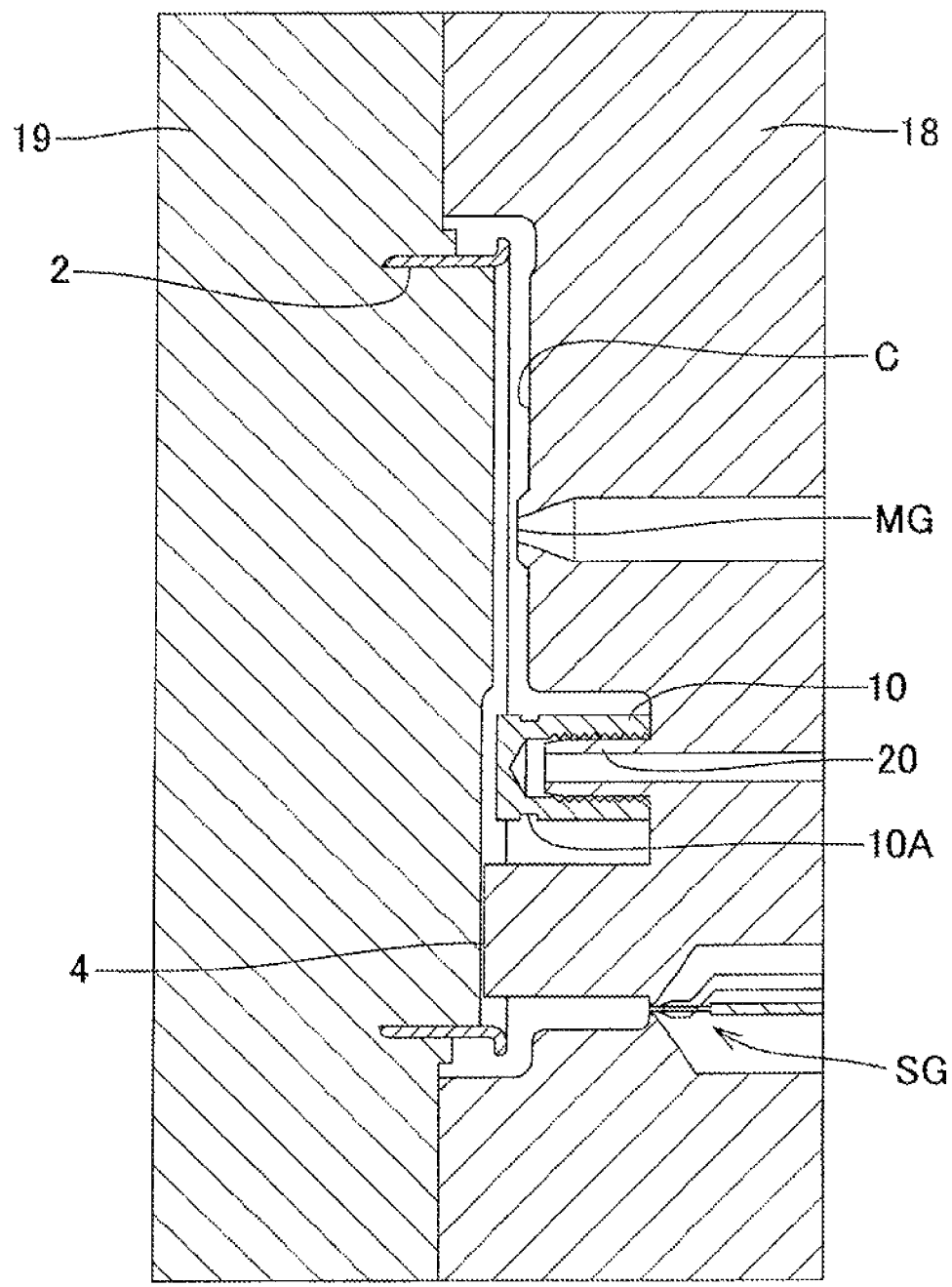
FIG. 14 is a vertical cross-sectional view of another injection molding die for molding the protective cover having the sensor holder part according to the second embodiment of the present invention, illustrating a configuration example in which a molten resin is preferentially charged into a thin part for forming the division wall from a sub gate arranged in the vicinity of the thin part.

First, in the injection molding die illustrated in FIG. 14, the nut 10 as an insert is set in a support shaft 20 of a fixed die 18 and the cylindrical member 2 as an insert is set in a movable die 19.

In the injection molding die of FIG. 14, the main gate MG is arranged in a position separated from the thin part 4 for forming the division wall B illustrated in FIG. 12, and the sub gate SG is arranged in the vicinity of the thin part 4 for forming the division wall B illustrated in FIG. 12. Alternatively, the sub gate SG may be arranged in the thin part 4 for forming the division wall B.

Next, the fixed die 18 and the movable die 19 are attached to an injection molding machine and are closed, and a molten resin is charged into a cavity C between the fixed die 18 and the movable die 19 from the main gate MG and the sub gate SG.

The timing for injecting the molten resin from the sub gate SG is controlled with respect to the timing for injecting the molten resin from the main gate MG such that the molten resin can be preferentially charged from the sub gate SG into the thin part 4.

For example, at the initial stage where the molten resin is charged into the cavity C, the molten resin is first charged from the main gate MG into a portion with a large cross section of the flow path, and then when the molten resin is charged to certain degree into the main body part 3A and the sensor holder part 3B in the vicinity of the thin part 4, a fresh molten resin is charged from the sub gate SG and merged with the molten resin from the main gate MG outside the thin part 4.

Accordingly, no charging end weld is generated on the division wall B illustrated in FIG. 12, thereby making it possible to prevent reduction in air tightness and strength of the division wall B positioned between the magnetic sensor A and the magnetic encoder 16.

The protective cover 1 as illustrated in FIG. 12 manufactured with the injection molding die illustrated in FIG. 14 has a gate mark of the main gate MG and a gate mark of the sub gate SG. In addition, when these gate marks are removed and processed, removal processed portions are formed.

In the foregoing description, the protective cover 1 is an insert molded article. However, the protective cover 1 is not limited to an insert molded article but may be made of a synthetic resin as described in Patent Document 1.

REFERENCE SIGNS LIST

1 Protective cover (insert molded article)
2 Cylindrical member (insert)
3 Disc-shaped member
3A Main body part
3B Sensor holder part
4 Thin part for forming a division wall
5 Flow path for preferentially charging a molten resin into a thin part
6 Thick part
7 Pressure pin
8 Sensor attachment hole
9 Attachment bolt
10 Nut (insert)
10A Peripheral groove
11 Bearing device
12 Inner ring
12A Inner ring track surface
13 Outer ring
13A Outer ring track surface
14 Rolling element
15 Seal member
16 Magnetic encoder
17 Support member
18 Fixed die
19 Movable die
20 Support shaft
21 Portion to be the division wall
A Magnetic sensor
B Division wall
C Cavity
D Device capable of controlling mechanically the thickness of the portion to be the division wall
E Thinned portion
F Position corresponding to the gate of the molding die
G Gate
MG Main gate
O Center of the disc-shaped member
P Molten resin
SG Sub gate capable of time control

The invention claimed is:

1. A protective cover having a sensor holder part for use in a bearing device including an inner ring with an inner ring track surface on an outer peripheral surface, an outer ring with an outer ring track surface on an inner peripheral surface, a bearing having a rolling element rolling between the inner ring track surface and the outer ring track surface, and a magnetic encoder positioned at one axial end portion of the bearing, fixed to the inner ring, and has N and S poles alternately arranged at regular intervals in a circumferential direction; and a magnetic sensor that is opposed to the magnetic poles of the magnetic encoder to detect rotation of the magnetic encoder, the protective cover comprising:

a disc-shaped member, wherein the disc-shaped member includes a main body part and the sensor holder part, the main body including a division wall, and a thick part, wherein the protective cover is a cup-shaped protective cover, wherein the sensor holder part holds the magnetic sensor and the division wall divides the magnetic encoder and the magnetic sensor, wherein out of a cylindrical member and the disc-shaped member forming the cup shape, at least the disc-shaped member is an injection-molded article, and wherein the thick part of the disc-shaped member, seen from a bottom surface, is approximately fan-shaped such that it becomes gradually wider with increasing proximity towards positions corresponding to the sensor holder part and the division wall from a position corresponding to a gate of the molding die in the injection molding, and wherein the thick part has a thickness of about 1.2 to 3 times larger than the thickness of a surrounding part of the thick part.

2. A bearing device, comprising a protective cover according to claim 1.

* * * * *